United States Patent [19]

Weyer et al.

[11] Patent Number: 5,561,217

[45] Date of Patent: Oct. 1, 1996

[54] PREPARATION OF POLYETHER GLYCOLS

[75] Inventors: Hans-Juergen Weyer, Mannheim; Rolf Fischer, Heidelberg; Rolf Pinkos, Bad Durkheim, all of Germany

[73] Assignee: BASF Aktiengesellschaft, Ludwigshafen, Germany

[21] Appl. No.: 427,274

[22] Filed: Apr. 24, 1995

Related U.S. Application Data

[63] Continuation of Ser. No. 167,047, Dec. 16, 1993, abandoned.

[30] Foreign Application Priority Data

Dec. 23, 1992 [DE]  Germany .................... 42 43 722.9

[51] Int. Cl.⁶ ....................................................... C08F 8/04
[52] U.S. Cl. ..................... 528/410; 502/325; 528/412; 528/417; 568/861; 568/862; 568/863; 568/867
[58] Field of Search ................................... 528/410, 412, 528/417; 502/325; 568/861, 862, 863, 867

[56] References Cited

U.S. PATENT DOCUMENTS

| Re. 32,084 | 2/1986 | Goetz ............................. 568/862 |
|---|---|---|
| 4,189,566 | 2/1980 | Mueller et al. . |
| 4,287,099 | 9/1981 | Baer et al. . |
| 4,298,766 | 11/1981 | Broecker et al. . |
| 4,517,391 | 5/1985 | Schuster et al. . |
| 4,608,422 | 8/1986 | Mueller ............................ 525/410 |
| 4,728,722 | 3/1988 | Mueller ............................ 528/413 |
| 4,803,299 | 2/1989 | Mueller . |
| 4,933,473 | 6/1990 | Ninomiya ......................... 568/862 |
| 4,980,503 | 12/1990 | Larkin et al. ..................... 572/517 |
| 5,002,922 | 3/1991 | Irgang et al. . |
| 5,037,793 | 8/1991 | Toussaint et al. . |
| 5,218,141 | 6/1993 | Mueller et al. . |

FOREIGN PATENT DOCUMENTS

| 003112 | 7/1979 | European Pat. Off. . |
|---|---|---|
| 009768 | 4/1980 | European Pat. Off. . |
| 018569 | 11/1980 | European Pat. Off. . |
| 110406 | 2/1984 | European Pat. Off. . |
| 151766 | 6/1985 | European Pat. Off. . |
| 241890 | 10/1987 | European Pat. Off. . |
| 0241890 | 10/1987 | European Pat. Off. . |
| 285420 | 5/1988 | European Pat. Off. . |
| 286454 | 10/1988 | European Pat. Off. . |
| 147219 | 3/1989 | European Pat. Off. . |
| 382049 | 8/1990 | European Pat. Off. . |
| 385632 | 9/1990 | European Pat. Off. . |
| 503394 | 9/1992 | European Pat. Off. . |
| 2445959 | 4/1976 | Germany . |
| 2445962 | 4/1976 | Germany . |
| 2519817 | 11/1976 | Germany . |
| 2366264 | 4/1980 | Germany . |
| 3410069 | 10/1985 | Germany . |
| 854958 | 11/1960 | United Kingdom . |
| 1450700 | 9/1976 | United Kingdom . |
| 1513556 | 6/1978 | United Kingdom . |
| 1551741 | 8/1979 | United Kingdom . |

*Primary Examiner*—James J. Seidleck
*Assistant Examiner*—John M. Cooney, Jr.
*Attorney, Agent, or Firm*—Keil & Weinkauf

[57] ABSTRACT

A process for the preparation of polyoxyalkylene glycols or polyoxyalkylene glycol copolymers from polyoxyalkylene glycol formates or the formates of polyoxyalkylene glycol copolymers comprises reacting the formates of polyoxyalkylene glycols or of polyoxyalkylene glycol copolymers in the liquid phase in the presence of a heterogeneous catalyst which contains, as catalytically active component, rhenium and/or at least one element from sub-group VIII of the Periodic Table of the Elements.

9 Claims, No Drawings

PREPARATION OF POLYETHER GLYCOLS

This application is a continuation of application Ser. No. 08/167,047, filed Dec. 16, 1993, now abandoned.

The present invention relates to a process for the preparation of polyoxyalkylene glycols or polyoxyalkylene glycol copolymers from polyoxyalkylene glycol formates or formates of polyoxyalkylene glycol copolymers.

Polyoxyalkylene glycols, which are also known as polyether glycols, in particular polyoxybutylene glycol, better known as polytetrahydrofuran, and the copolymers of tetrahydrofuran with, for example, 1,2-alkylene oxides, such as ethylene oxide, propylene oxide or 1,2-butylene oxide, etc., and/or with diols, such as ethylene glycol, propylene glycol, 1,3-propanediol, 1,2-butanediol, 1,6-hexanediol, etc., are prepared by cationic ring-opening polymerization of cyclic ethers by means of Brønstedt and Lewis acid catalysts (cf., for example, EPA-3112, EP-A 151 766, British Patent 854, 958, EP-A 241 890, EP-A 385 632 and EP-A 286 454). In general, a carboxylic acid compound, in particular a carboxylic anhydride, is added to the polymerization mixture, with the diester in question being formed. A process for the preparation of, inter alia, polytetrahydrofuran monoformates carries out the polymerization in the presence of a heteropolyacid catalyst and in the presence of carboxylic acids, such as formic acid (cf. EP-A 503 394).

The polyether glycol esters prepared in this way are conventionally converted into the polyether glycols in question by hydrolysis (DE-A 24 45 962), transesterification DE-A 24 45 959) or hydrogenation (DE-A 34 10 069). All these ways of liberating polyoxyalkylene glycols from their carboxylates require relatively high process complexity, which increases the production costs. The particular disadvantage of these processes is that an aqueous or solvent-containing solution of the hydrolysis or transesterification reagents must be added to the polyoxyalkylene glycol ester, and the water or solvent must be removed again from the polyoxyalkylene glycol after liberation thereof. In addition, the hydrogenation of the polyoxyalkylene glycol esters requires considerable amounts of hydrogen.

It is an object of the present invention to find a process for the liberation of polyoxyalkylene glycols from their carboxylic acid esters which allows the polyoxyalkylene glycols to be liberated catalytically in one step and without further separation. The aim is to liberate the polyoxyalkylene glycols as completely as possible in a very short time, and for the polyoxyalkylene glycols obtained to contain no impurities which impair their later use. Since the polyoxyalkylene glycols are employed as the diol component in the preparation of polyurethanes, it is essential, for example, that the polyoxyalkylene glycols prepared in this way have a low color index, ie. are virtually free from discoloration-causing impurities.

We have found that this object is achieved by a process for the preparation of polyoxyalkylene glycols or polyoxyalkylene glycol copolymers from polyoxyalkylene glycol formates or the formates of polyoxyalkylene glycol copolymers, which comprises reacting the formates of polyoxyalkylene glycols or of polyoxyalkylene glycol copolymers in the liquid phase in the presence of a heterogeneous catalyst which contains, as catalytically active component, rhenium and/or at least one element from sub-group VIII of the Periodic Table of the Elements.

In the process according to the invention, the formates of polyoxyalkylene glycols or polyoxyalkylene glycol copolymers are decarbonylated by means of the catalysts according to the invention, with the polyoxyalkylene glycol in question being formed virtually quantitatively, and virtually the only other product formed being gaseous carbon monoxide, which escapes from the reaction mixture.

The decarbonylation of the polyoxyalkylene glycol formates can be carried out using, as catalysts, the metals or compounds of metals from sub-group VIII of the Periodic Table, ie. iron, ruthenium, osmium, cobalt, rhodium, iridium, nickel, palladium and platinum, and rhenium, or compounds of rhenium. Preference is given to catalysts containing nickel, cobalt, palladium, ruthenium and/or rhenium. The catalysts are employed as heterogeneous catalysts.

Said catalytically active components of the catalysts according to the invention can be used in various forms. Thus, it is possible to use the individual metals in elemental form without further additions as decarbonylation catalysts. Preference is given to preparations of these metallic catalysts which have a large surface area, for example Raney nickel, Raney cobalt, platinum sponge, palladium sponge or iron carbonyl powder.

The decarbonylation catalysts which can be used in the process according to the invention may also contain the catalytically active metals deposited on an inert support material. Examples of suitable support materials for this purpose are activated charcoal, low-solubility salts and oxides of the alkaline earth metals, for example magnesium oxide, calcium oxide, strontium oxide, barium oxide, magnesium carbonate, calcium carbonate, strontium carbonate, barium carbonate, calcium sulfate, strontium sulfate and barium sulfate, the oxides and low-solubility salts of the rare-earth metals, titanium dioxides, zirconium dioxide, zinc oxide, aluminum oxides, silicon dioxide, kieselguhr, silicon carbide, tin dioxide, germanium dioxide, lead oxide, thorium oxide, bismuth oxide and silicates, for example steatite. Mixtures of two or more of these support materials can also advantageously be used as catalyst supports. Preference is given to neutral or basic support materials, in particular activated charcoal, silicon carbide, silicon dioxide, zirconium dioxide, titanium dioxides, aluminum oxides, barium sulfate and calcium carbonate.

The process according to the invention is particularly advantageously carried out using supported catalysts whose supports comprise aluminum oxide, titanium dioxide, zirconium dioxide and/or silicon dioxide and are additionally doped with one or more alkaline compounds of the alkali metals and/or alkaline earth metals. In general, these support materials contain alkali metals and/or alkaline earth metals in an amount of from 0.01 to 70% by weight, preferably from 0.1 to 40% by weight, based on the weight of the support material and in each case calculated as the alkali metal oxide or alkaline earth metal oxide. The alkali metals, calculated as alkali metal oxides, can advantageously be present in the support in an amount of from 0.01 to 7% by weight, preferably from 0.01 to 2% by weight, based on the weight of the support material. If the support is doped with alkaline earth metals, the latter may advantageously be present, again calculated as oxides and based on the weight of the support, in an amount of from 0.01 to 70% by weight, preferably from 0.5 to 40% by weight.

The way in which these base-doped supports are prepared is generally not crucial to the success of the process according to the invention, and consequently these supports can be prepared in a variety of ways. For example, the alkali metal compounds and alkaline earth metal compounds, for example their hydroxides, carbonates, hydrogencarbonates, sulfates, nitrates and oxides, in solid form can be mixed with the support material, pressed to give moldings and if necessary, in particular if alkali metal salts or alkaline earth metal salts are used, then calcined at from 200° to 650° C., preferably at from 250° to 600° C., with the oxides in question presumably forming.

The base-doped support materials may furthermore be prepared by precipitation, drying and, if necessary, subsequent calcination of solutions, generally aqueous, of the salts of the support material, for example by means of alkali metal hydroxides or alkaline earth metal hydroxides or preferably alkali metal carbonates or hydrogencarbonates or alkaline earth metal carbonates or hydrogencarbonates. In particular in the case of doping with basic alkaline earth metal compounds, the alkaline earth metals can be precipitated under these conditions together with the actual support material. The precipitation is expediently followed by drying of the resultant precipitate at from 40° to 200° C., preferably at from 60° to 180° C., and, if necessary, by calcination at the above temperatures.

It is of course also possible for the basic alkali metal compounds or alkaline earth metal compounds to be deposited on the support material by impregnation with solutions of their hydroxides, carbonates, hydrogen carbonates, sulfates, hydrogen sulfates, nitrates or carboxylates, the thus-impregnated support then expediently being dried. After drying, the impregnated support can be calcined, a measure which proves advantageous, in particular, if the support is impregnated with non-basic or only weakly basic salts of the alkali metals or alkaline earth metals. During this calcination, these compounds are presumably decomposed to the corresponding oxides. The impregnation of the support with the alkali metal or alkaline earth metal components can be carried out before, during or after the impregnation of the support with the catalytically active metal components. The impregnation with alkali metal and/or alkaline earth metal is preferably carried out before the impregnation with the catalytically active components.

The chemical form in which the alkali metal components or alkaline earth metal components applied in this way are present on the support or in the catalyst is not known. They may be in the form of hydroxides, carbonates or oxides, or these basic components may form fully or partly chemical compounds, for example silicates, aluminates or titanates, with the support material, in particular during calcination. Since the alkali metal components or alkaline earth metal components of the supports doped in this way are consequently presumably not in homogeneous form in the support or later in the catalyst, the alkali metal components or alkaline earth metal components applied in each case are, for the purposes of calculating their content, considered in total as the corresponding alkali metal oxides or alkaline earth metal oxides. Since, in particular, the basic action of the alkali metal and/or alkaline earth metal doping appears responsible for the advantageous properties of the supports and catalysts doped therewith, the nature of the alkali metal element and/or alkaline earth metal element used for the doping is generally not crucial. The supported catalysts used in the process according to the invention are preferably doped with lithium, sodium, potassium, magnesium, calcium and/or barium.

The application of the catalytically active metals to the support is generally not crucial and can be effected in various ways. The catalytically active parts can be applied to these support materials by, for example, impregnation with solutions of the salts of the corresponding elements and subsequent reduction of these metal salts to the corresponding metals or compounds of low oxidation state by means of a reducing agent, preferably with the aid of hydrogen or complex hydrides. Another way of applying the catalytically active metals to these supports comprises impregnating the supports with solutions of salts which readily undergo thermal decomposition, for example with nitrates, or with complex compounds which readily undergo thermal decomposition, for example with carbonyl or hydrido complexes of the catalytically active metals, and heating the thus-impregnated support to from 300° to 600° C. in order to thermally decompose the adsorbed metal compound. This thermal decomposition is preferably carried out under a protective-gas atmosphere. Examples of suitable protective gases are nitrogen, carbon dioxide, hydrogen and noble gases. The catalytically active metals may furthermore be deposited on the catalyst support by vapor deposition or by flame spraying.

Particularly preferred supported catalysts of the above-described type are those which contain palladium, platinum, ruthenium or rhenium deposited on a support of activated charcoal, aluminum oxide, titanium dioxide, zirconium dioxide or silicon dioxide which have advantageously been doped with basic compounds of the alkali and/or alkaline earth metals in the above-described manner. The content of catalytically active metals in these catalysts can be from 0.1 to 10% by weight, preferably from 1 to 5% by weight, calculated as metals. It is of course also possible for a plurality of catalytically active metals to be applied to the particular support material. To this end, the catalytically active metals can be applied to the support by, for example, the processes of DE-A 25 19 817, EP-A 147 219 and EP-A 285 420. The catalytically active metals from sub-group VIII of the Periodic Table and the rhenium are partly present in these catalysts in the form of alloys formed by thermal treatment and/or reduction of the salts or complexes of the abovementioned metals deposited on a support by, for example, impregnation. Particularly preferred decarbonylation catalysts of this type are palladium/rhenium- and platinum/rhenium-containing catalysts.

Furthermore, precipitation catalysts, for example, can be used in the process according to the invention. Such catalysts can be prepared by precipitating their catalytically active components from their salt solutions, in particular from the solutions of their nitrates and/or acetates, for example by addition of alkali metal and/or alkaline earth metal hydroxide and/or carbonate solutions, as, for example, low-solubility hydroxides, oxyhydrates, basic salts or carbonates, subsequently drying the resultant precipitates, and converting the latter into the corresponding oxides, mixed oxides and/or mixed-valency oxides by calcination, in general at from 300° to 700° C., in particular at from 400° to 600° C., then reducing all or the majority of the rhenium and the elements of sub-group VIII to the corresponding metals or to compounds of low oxidation state by treatment in a stream of hydrogen, generally at from 200° to 700° C., in particular at from 200° to 400° C., and converting them into the actual catalytically active form. The reduction is generally continued until water is no longer formed. In the preparation of precipitation catalysts which contain a support material, the precipitation of the catalytically active components can be carried out in the presence of the corresponding added or pre-precipitated solid support material, but the catalytically active components may advantageously also be precipitated from the corresponding salt solutions at the same time as the support material.

Examples which may be mentioned of catalysts prepared in this way which can be used in the process according to the invention are the catalysts containing elements of sub-group VIII and/or rhenium which are described in U.S. Pat. No. 5,037,793, EP-A 382 049, EP-A 100 406, EP-A 18 569, EP-A 9 768 and DE-A 23 66 264.

A multiplicity of decarbonylation catalysts which can be employed according to the invention and contain, as catalytically active component, rhenium and/or at least one element from the sub-group VIII of the Periodic Table of the Elements have hitherto been used in other ways, for example as hydrogenation catalysts. The catalytically active material of these catalysts may also contain an amount of other elements which promotes the respective use. In so far as the additional elements present in the catalytically active material promote the decarbonylation of the polyoxyalkylene glycol formates, their action is generally inferior to that of the catalytically active components to be used according to the invention, which is why preferred catalysts in the process according to the invention are those whose catalytically active material, irrespective of the type of preparation, comprises at least 50% by weight of rhenium and/or one or more elements of sub-group VIII of the Periodic Table. The rhenium and the elements of sub-group VIII of the Periodic Table may in principle be present in the catalyst in any oxidation state, but low oxidation states are preferred. Particular preference is given to catalysts which contain these catalytically active elements in metallic form.

With the aid of the process according to the invention, polyoxyalkylene glycol formates of any type, ie monoformates, diformates and polyoxyalkylene glycol formates containing more than 2 formate groups per molecule can be decarbonylated to give the corresponding polyoxyalkylene glycols. It is of course possible to employ both homopolymeric polyoxyalkylene glycol formates, for example the formates of polyethylene glycol, polypropylene glycol and polytetrahydrofuran, and copolymeric polyoxyalkylene glycol formates as starting compounds, there generally being no restriction of the type of comonomer in these polyoxyalkylene glycol formates as far as the success of the decarbonylation process according to the invention is concerned. In addition to the principal monomers (ethylene oxide, propylene oxide, tetrahydrofuran and methyl tetrahydrofuran may be mentioned merely by way of example as the most important commercial representatives thereof), the above-mentioned monomers may be present as comonomers, depending on which monomer is the principal monomer. Other comohomers which can be incorporated into the polyoxyalkylene glycol formates serving as starting material according to the invention are, for example, ethylene glycol, propylene glycol, oxetane, 1,3-propanediol, glycerol, glycidol, 1,4-butanediol, 1,2-butylene glycol, 1,3-butanediol, 2,3-butylene glycol, pentanediols, pentaerythritol, 1,6-hexanediol, sugar alcohols, such as sorbitol, mannitol and xylitol, neopentyl glycol, neopentyl glycol hydroxypivalic acid esters, dioxane, γ-butyrolactone and ε-caprolactone, and other polyoxyalkylene glycols which, for example as blocks, can be copolymerized into the corresponding starting material.

In order to carry out the process according to the invention, the corresponding polyoxyalkylene glycol formate, in solid or dissolved form is brought into contact with the decarbonylation catalysts to be used according to the invention. A variety of solvents can be used, for example aliphatic and aromatic hydrocarbons, alcohols, in particular $C_1$–$C_{20}$ alcohols, ethers, such as diethyl ether, diisopropyl ether, dipropyl ether, methyl tert-butyl ether, ethyl tert-butyl ether, anisole, phenetole, tetrahydrofuran and dioxane, and esters of $C_2$–$C_{20}$ carboxylic acids. The addition of a solvent may have an advantageous effect on the reaction according to the invention, for example by reducing the viscosity of the reaction mixture. However, the process is particularly preferably carried out in the absence of such a solvent, since the removal of the solvent during work-up of the reaction mixture is thus unnecessary.

The catalyst can be employed as a suspension catalyst for the decarbonylation of the polyoxyalkylene glycol formates; preferably, and in particular if the process according to the invention is carried out continuously in a tubular reactor or in a reactor cascade, it is arranged in a fixed bed over which the reaction mixture can be passed upward or downward. The feed of a reaction mixture is expediently controlled so that from 0.01 to 100 parts by weight, preferably from 0.1 to 50 parts by weight of the catalytically active material of the catalyst are present per 100 parts by weight of polyether glycol formate per hour. It is of course possible to further increase the amount of catalyst with respect to the polyoxyalkylene glycol formate.

The polyoxyalkylene glycol formates are generally decarbonylated at from 0° to 350° C., preferably at from 50° to 300° C. in particular at from 80° to 250° C., advantageously under autogenous pressure. It is also possible to work under superatmospheric pressure or reduced pressure, in particular under the autogenous pressure of the reaction system.

The reaction duration, including the residence time of the polyoxyalkylene glycol formates in the reactor, depends on the starting material, the reaction temperature and the amount of catalyst and is expediently optimized for each individual case. The course of the decarbonylation can be followed, for example, by infrared (IR) spectroscopy by measuring the decrease in the strength of the carbonyl band in the IR spectrum or by measuring the amount of carbon monoxide liberated.

For safety reasons, the process according to the invention is usually carried out under a protective-gas atmosphere, either of reducing gases, such as hydrogen, or inert gases, such as nitrogen or argon.

The process according to the invention allows conversion of polyoxyalkylene glycol formates to the corresponding polyoxyalkylene glycols economically, in good yields and in particular in high purity and with a low color index which enables them to be used as the diol component for the preparation of polyurethanes.

EXAMPLES

The following examples were carried out using polytetrahydrofuran monoformate having a mean molecular weight of 950 daltons prepared by polymerizing tetrahydrofuran in the presence of formic acid and in the presence of the catalyst $H_3PW_{12}O_{40}$ by the process of EP-A 503 394.

Catalysts A to F used had the following compositions (% data in % by weight):

A) 100% of Ni (Raney nickel)

B) 50.7% of nickel, calculated as NiO; 16.9% of copper, calculated as CuO; 30.8% of zirconium, calculated as $ZrO_2$; 1.6% of molybdenum, calculated as $MoO_3$.

C) 63.4% of cobalt, calculated as CoO; 18.1% of copper, calculated as CuO; 6.8% of manganese, calculated as $Mn_3O_4$; 3.1% of molybdenum, calculated as $MoO_3$; 3.3% of phosphorus, calculated as $P_2O_5$; 0.15% of sodium, calculated as $Na_2O$; 5.1% of $H_2O$.

D) 10% of Pd on 90% of activated charcoal

E) 5% of Ru on 95% of activated charcoal

F) 3% of Re on 97% of activated charcoal

G) 0.5% of Pd on a support comprising 80% of $Al_2O_3$ and 20% of CaO.

Catalysts A, D, E and F were employed as powders. Catalyst B, prepared by the process of U.S. Pat. No. 5,037,793, catalyst C, prepared by the process of EP-A 100 406, and catalyst G, prepared by impregnating, with an aqueous palladium nitrate solution, the $Al_2O_3$/CaO support obtained by compounding moist $Al_2O_3$ and CaO and subsequently calcining the mixture at 550° C., were used in the form of 4 mm pellets which, before use in the process according to the invention, had been reduced in a stream of hydrogen at 240° C. (catalysts A to F) or at 190° C. (catalyst G) until no further water was formed. Catalysts A, D, E and F were commercially available catalysts.

For the decarbonylation, 50 g of polytetrahydrofuran monoformate were heated in a glass flask under a nitrogen atmosphere at a pressure of 1 bar under the conditions shown in the table. When the reaction was complete, the polymer was separated from the catalyst by filtration. The course of the reaction was followed by IR spectroscopy. The reaction time shown in the table is the time necessary for the absorption of the carbonyl vibration at 1,724 $cm^{-1}$ in the IR spectrum to drop to 5% of its original value.

TABLE

| Example | Catalyst | Amount of catalyst [g] | Reaction temperature [°C.] | Reaction time [h] |
|---|---|---|---|---|
| 1 | A | 7 | 250 | 3 |
| 2 | B | 10 | 200 | 6 |
| 3 | C | 10 | 250 | 5 |
| 4 | D | 5 | 200 | 11 |
| 5 | E | 9 | 250 | 8 |
| 6 | F | 16 | 250 | 15 |
| 7 | G | 25 | 130–150 | 15 |

We claim:

1. A process for the preparation of polyoxyalkylene glycols or polyoxyalkylene glycol copolymers from polyoxyalkylene glycol formates or the formates of polyoxyalkylene glycol copolymers, which comprises decarbonylating the formates of polyoxyalkylene glycols or of polyoxyalkylene glycol copolymers in the absence of hydrogen in the liquid phase in the presence of a heterogeneous catalyst which contains, as catalytically active component, at least one metal selected from the group consisting of rhenium, iron, ruthenium, osmium, cobalt, rhodium, iridium, nickel, palladium and platinum so that the corresponding polyoxyalkylene glycols, or copolymers thereof, and carbon monoxide are produced.

2. A process as claimed in claim 1, wherein the heterogeneous catalyst contains, as a catalytically active component, at least one element selected from the group consisting of nickel, palladium, cobalt, ruthenium and rhenium.

3. A process as claimed in claim 1, wherein catalysts are used whose catalytically active component has been applied to a support material.

4. A process as claimed in claim 1, wherein catalysts are used whose catalytically active component has been applied to a support material and which also contain a basic alkali metal compound and/or alkaline earth metal compound.

5. A process as claimed in claim 1, wherein catalysts are used whose catalytically active component has been applied to a support material and which also contain from 0.01 to 70% by weight, based on the support material employed, of a basic alkali metal compound and/or alkaline earth metal compound, calculated as alkali metal oxide or alkaline earth metal oxide.

6. A process as claimed in claim 1, wherein the named catalytically active component comprises at least 50% by weight of the heterogeneous catalyst.

7. A process as claimed in claim 1, wherein the reaction is carried out at from 0° to 350° C.

8. The process of claim 1, wherein the decarbonylation step is carried out in the presence of an inert gas.

9. The process of claim 8, wherein the inert gas is nitrogen or argon.

\* \* \* \* \*